May 22, 1934.   F. S. SMITH   1,960,174
APPARATUS FOR STERILIZING
Filed Nov. 27, 1931   4 Sheets-Sheet 1
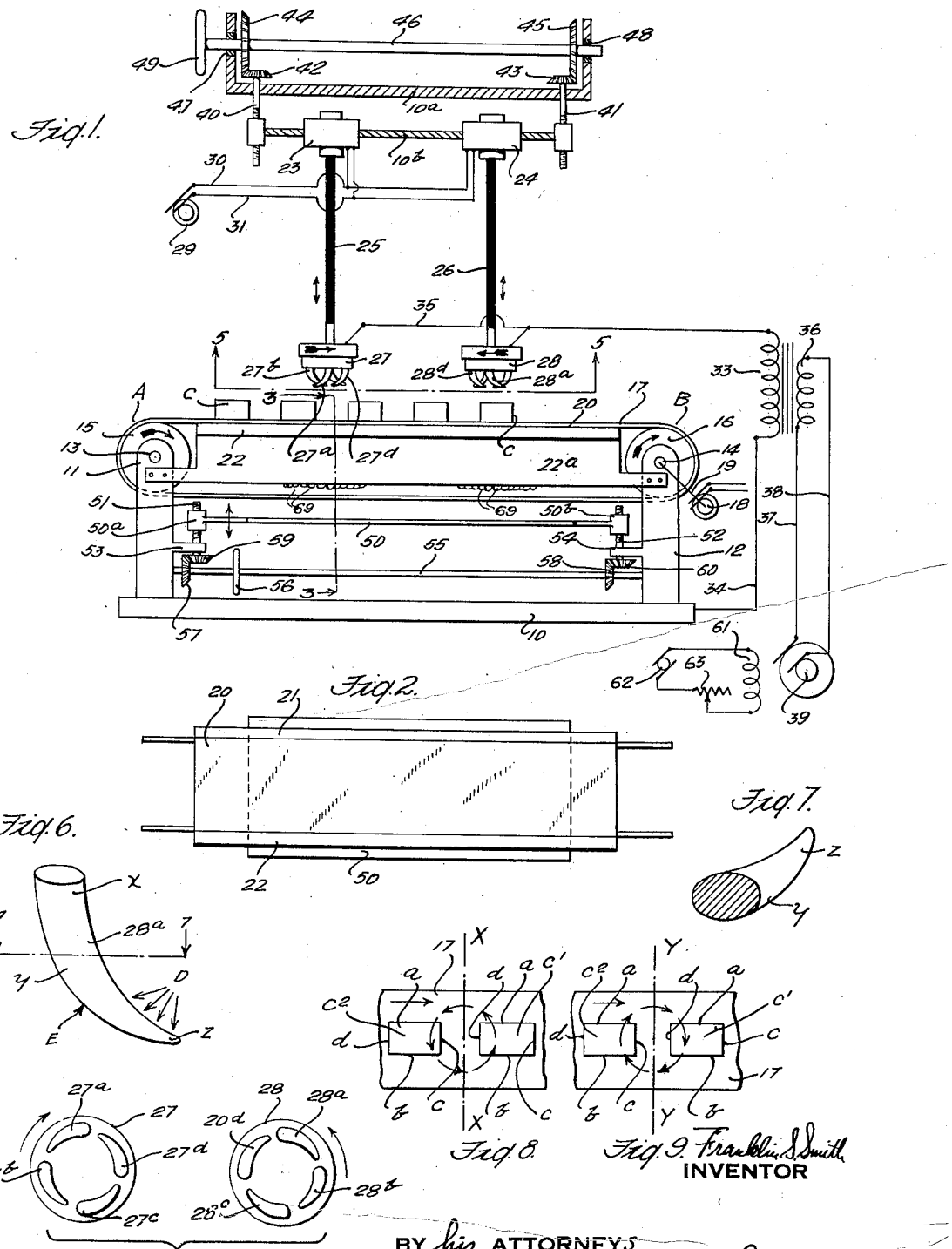

May 22, 1934.  F. S. SMITH  1,960,174
APPARATUS FOR STERILIZING
Filed Nov. 27, 1931   4 Sheets-Sheet 2
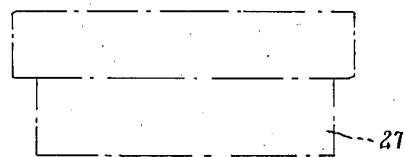
Fig. 3.
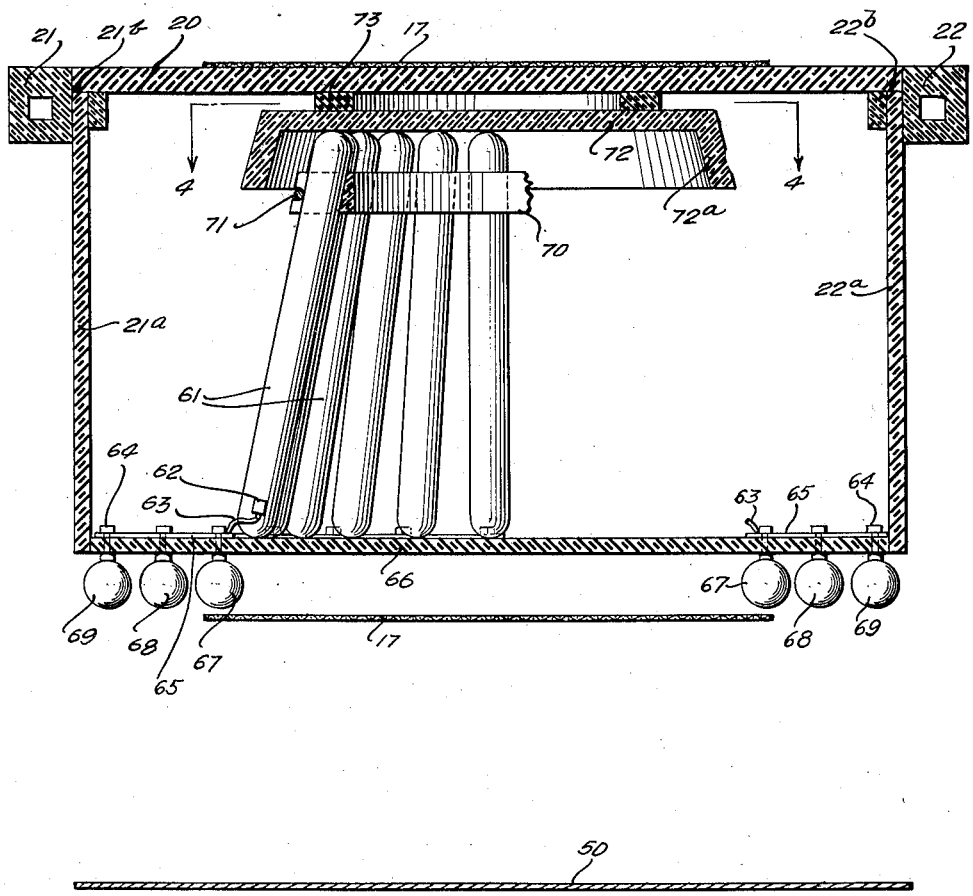

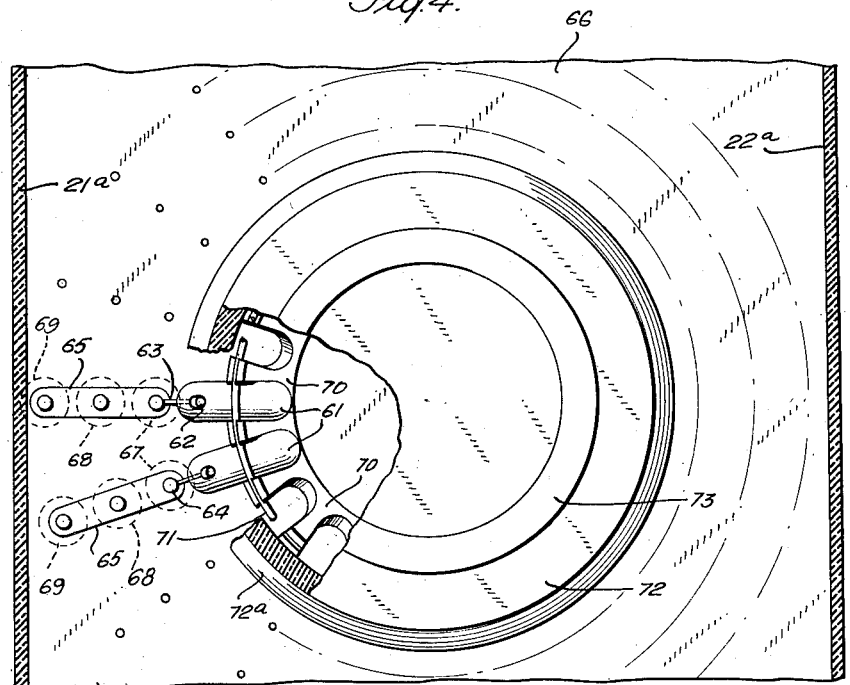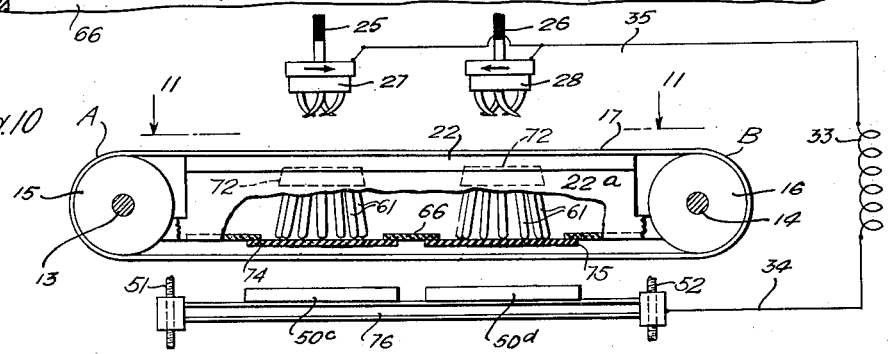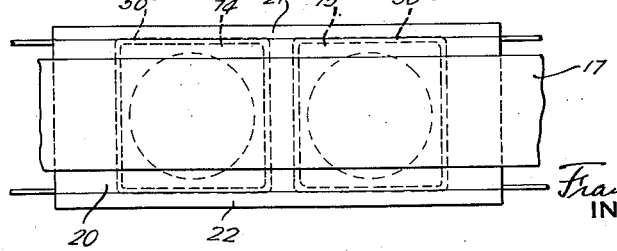

May 22, 1934.          F. S. SMITH          1,960,174
APPARATUS FOR STERILIZING
Filed Nov. 27, 1931          4 Sheets-Sheet 4
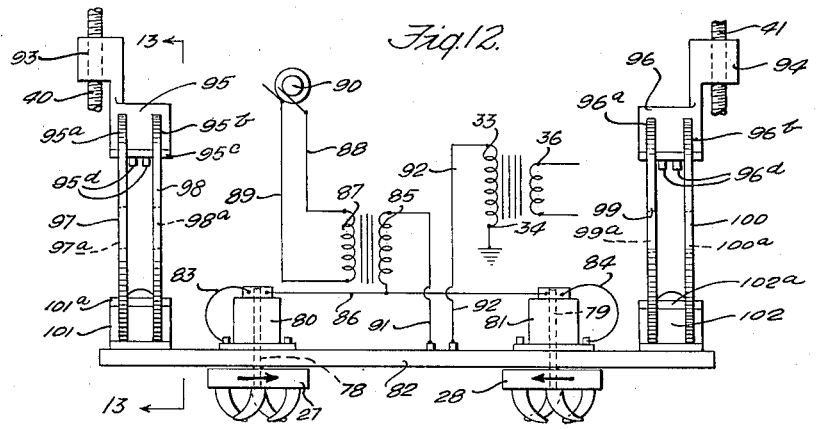
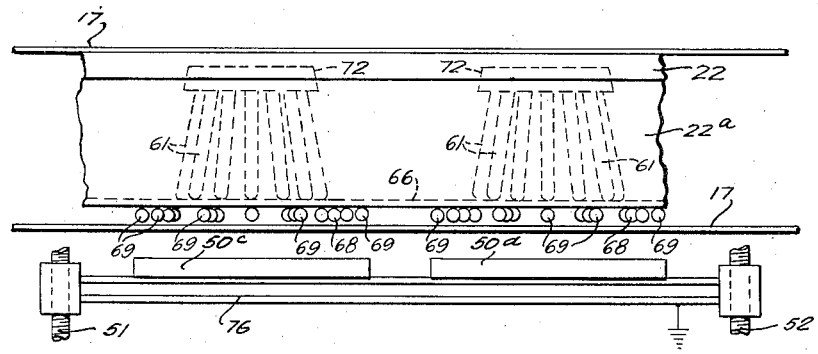
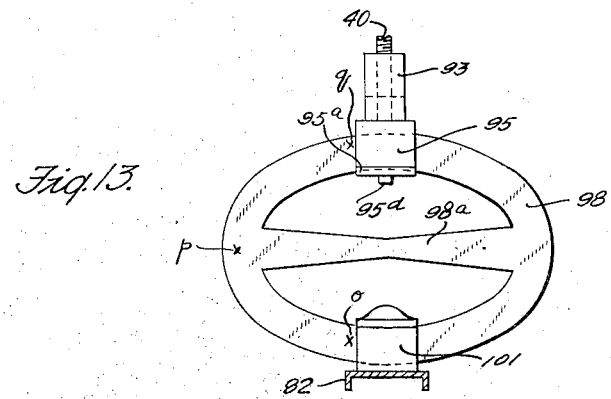
Franklin S. Smith
INVENTOR
BY his ATTORNEYS
Janney, Blair & Curtis Patented May 22, 1934

1,960,174

UNITED STATES PATENT OFFICE 1,960,174

APPARATUS FOR STERILIZING

Franklin S. Smith, New Haven, Conn.

Application November 27, 1931, Serial No. 577,521

48 Claims. (Cl. 175—311)

This invention relates to an apparatus for destroying insect life in food and other products.

One of the objects of this invention is to provide a dependable and efficient apparatus for subjecting food and other products that contain insects and/or their eggs, larvæ and pupæ thereof to effective and reliable treatment for destroying such insect life, as has just been noted but without endangering or harming the product itself. Another object is to provide an apparatus of the above-mentioned character for electrically destroying such insect life in a manner that will be at once highly efficient and economical, of dependable control, and of wide range of efficient action. Another object is to provide an apparatus of the above-mentioned character in which a highly efficient and thoroughly reliable and precise control of the high voltage energy may be achieved in an inexpensive and simple but thoroughly practical manner and in which the destructive forces or actions may be highly and reliably concentrated. Another object is to provide an apparatus of the above-mentioned character in which thoroughly reliable and dependable results may be rapidly and economically achieved. Other objects will be in part obvious or in part pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the accompanying drawings, in which are shown several of the various possible embodiments of the electrical and mechanical features of my invention, Figure 1 is a front elevation of one form of apparatus, certain parts therein being shown diagrammatically;

Figure 2 is a detached plan view of a belt support and related parts employed in the apparatus of Figure 1;

Figure 3 is a vertical cross-sectional view on an enlarged scale, as seen substantially along the line 3—3 of Figure 1;

Figure 4 is a detached plan view as seen substantially along the line 4—4 of Figure 3, certain of the parts being broken away to show certain features of construction more clearly;

Figure 5 is a view on an enlarged scale, as seen along the line 5—5 of Figure 1, of a preferred arrangement of certain electrodes;

Figure 6 is a front elevation on an enlarged scale of an electrode member;

Figure 7 is a horizontal sectional view as seen along the line 7—7 of Figure 6;

Figures 8 and 9 are fragmentary plan views of the conveyor belt showing packages thereon and indicating diagrammatically certain actions thereon of the different electrode structures;

Figure 10 is a view like that of Figure 1 but showing a modified form of apparatus;

Figure 11 is a fragmentary plan view, as seen along the line 11—11 of Figure 10;

Figure 12 is a view like that of Figure 1 but showing a modified form of apparatus, and Figure 13 is a vertical sectional view as seen along the line 13—13 of Figure 12.

Similar reference characters refer to similar parts throughout the several views of the drawings.

Referring now to Figure 1, there is indicated diagrammatically a suitable frame 10 provided at its respective ends with appropriate pairs of standards 11 and 12 in which are suitably journaled the shafts 13 and 14, respectively, of drums 15 and 16, respectively, about which extends a conveyor belt 17, the latter being made of asbestos or a suitable canvas or cotton material, or the like.

One of the drums, such as the drum 16, is suitably driven and I have diagrammatically indicated a motor 18 connected to the drum 16 by any suitable transmission diagrammatically indicated at 19 for driving the pulley or drum 16 and for thus causing a movement of the belt 17. The direction of drive is preferably such that the drums rotate in clockwise direction and hence so that the upper portion of the belt 17 moves in a direction from the left to the right, as viewed in Figure 1. Illustratively, the rate of drive of the pulley 16 may be such that the movement of the belt 17 takes place at a rate of about 15 feet per minute but it is not to be understood that this is a limiting rate of drive but that the belt may be driven at any other suitable speed.

The belt 17 is adapted to receive at its left-hand end, as at the point A, the material or goods or articles to be sterilized and thus to transport the goods in a direction toward the right and to discharge them at the right-hand end of the belt as at the point B. Any suitable means, not shown, may be utilized to feed the articles onto the belt and to receive them when discharged therefrom.

Underneath the article-carrying portion of belt 17 and extending lengthwise thereof is a plate-like member 20 (see also Figure 2) having a width equal to or greater than the width of the belt 17; member 20 aids to prevent sagging of the belt 17 under its load and insures the passage of the goods or articles to be treated along the intended and predetermined path.

Plate member 20 is made of any suitable solid dielectric material preferably of Pyrex glass, for example, and it extends in a direction lengthwise of the belt throughout a suitable distance; plate 20 is supported by two laterally spaced and lengthwise extending beams 21 and 22 (see Figures 2 and 3) secured in any suitable manner at their respective ends to the frame 10, being illustratively and preferably secured to the standards 11 and 12. Beams 21 and 22 are made of any appropriate or suitable solid dielectric material, such as bakelite, for example, and are preferably given a cross-section and adapted to resist bending. The cross-section may be, for example, L-shaped or it may be shaped as indicated in Figure 3. Any suitable means may be utilized to secure the plate 20 to its supporting beams 21 and 22.

If desired, the cross-beams 21 and 22 may be reinforced by side members $21^a$ and $22^a$, respectively, these side members being made of sheet-like solid dielectric material, such as bakelite, and secured along their upper edges to the beams 21 and 22. Members $21^a$ and $22^a$ thus form downwardly extending flanges that offer substantial resistance to bending by any load carried thereby. Also, members $21^a$ and $22^a$ are secured respectively to beams 21 and 22 (see Figure 3) so that there is formed a bezel, as at $21^b$ and $22^b$, respectively, into which the longitudinal side edge portions of the plate 20 are fitted.

The upper portion of the frame 10 indicated in Figure 1 at $10^a$ supports a plurality of electric motors illustratively shown as two in number at 23 and 24, the motors being supported preferably with their shafts extending vertically. To the lower ends of the shafts of these motors are connected driving members 25 and 26, respectively, made of suitable solid dielectric material and these in turn support at their lower ends multiple electrode structures 27 and 28, respectively. Motors 23 and 24 are supplied with energy from any suitable source diagrammatically indicated at 29 through line conductors 30 and 31 and are driven at a speed and in directions illustratively described below.

The electrode structure 28 includes a disklike member which has secured to its lower face, as viewed in Figure 1, a plurality of electrode members illustratively four in number and shown in Figure 1 at $28^a$, $28^b$, $28^c$ and $28^d$. These electrode members are preferably of identical construction and in Figure 6 one of them, illustratively member $28^a$, is shown on an enlarged scale. It will be seen to have a downwardly extending portion indicated at $x$ and a lower end or somewhat pointed portion $z$ connected by an intermediate portion $y$ which is curved in two directions, being curved downwardly and toward the right and, as is better shown in Figures 5 and 7, is also curved to conform relatively closely to the arc of the circle along the circumference of which the four electrode members $28^a$, $28^b$, $28^c$ and $28^d$ are equidistantly spaced. Motor 24 is driven in a direction to cause the electrode structure 28 to rotate in the direction of the arrows indicated in Figures 1 and 5, and portion $x$ of each electrode member being the leading portion and the tip $z$ being the trailing portion.

Multiple electrode structure 27 is also provided with electrode members, illustratively four in number and shaped substantially like the members above described in connection with the multiple electrode structure 28; they are likewise equidistantly spaced about a circle on the under surface of the base or disk member of the structure 28 (see Figure 5) but, motor 23, being driven so as to rotate electrode structure 27 in a direction opposite from the direction of rotation of the electrode structure 28, the electrode members $27^a$, $27^b$, $27^c$ and $27^d$ are reversed in position so that again the portions $x$ thereof are the leading portions and the tip or substantially pointed ends $z$ thereof are the trailing portions. This relation of these parts is better shown in Figure 5.

The electrode members depending from the structures 27 and 28, as appears better from Figure 6, are tapered and are of substantially circular cross-section where the section is taken at right angles through any point along the curved center or axis of the electrode member; this relation is of greater advantage inasmuch as the horizontal section taken through any one member, such as the section 7—7 of Figure 4, is substantially elliptical (see Figure 7) and thus gives a section that is substantially stream-lined with respect to the actual movement of the electrode member about its axis of rotation. The resultant substantially elliptical or stream-line cross-section is all the more emphasized the nearer that the horizontal section approaches the tip $z$. The purpose of this construction will be later dealt with herein.

The electrode tips $z$, of each of the oppositely rotating multiple electrode structures, have a velocity of about 4000 feet per minute in an orbit the plane of which is above and substantially parallel to the conveying portion of the belt 17. The spacing between the plane of these discharge points and the upper surface of conveyor belt 17 and through which spacing the products or articles to be sterilized are to pass, may be varied in any suitable manner as, for example, by raising or lowering, preferably conjointly or simultaneously, the electrode structures 27 and 28; an illustrative embodiment of an arrangement for so raising or lowering the latter is shown in Figure 1.

Motors 23 and 24 are carried by or secured to an auxiliary frame member $10^b$ which is mounted for vertical movement with respect to the frame portion $10^a$. Conveniently and preferably I provide rotatable screws 40 and 41 extending vertically and threaded into suitably threaded parts of the auxiliary frame $10^b$, the screws 40—41 being rotatably supported in suitable bearings in the upper portion $10^a$ of the frame, the mounting being of such a character that rotation of the screws may take place while movement of the latter in the direction of their respective axes is prevented. The lower ends of the screws have secured thereto bevel gears 42 and 43, respectively, with which mesh bevel gears 44 and 45, respectively, the latter being secured to a shaft 46 mounted in suitable bearings 47—48 carried by the frame portion $10^a$. A hand-wheel 49 secured to shaft 46 permits a manual rotation of the shaft 46 and hence control of the direction and extent of rotation of the screws 40—41 and thus the spacing of the electrode structures 27 and 28 above the belt 17 may be controlled or determined at will, for a purpose to be more clearly set forth hereinafter.

The various discharge or electrode members carried by the electrode structures 27 and 28 will thus be seen to be dependably insulated (through non-conducting members 25—26) from the frame of the apparatus and may, as is more clearly set forth below, be thus subjected to a suitable relatively high potential while at the same time control of their height above the belt and their distance from other coacting parts of the apparatus to be more clearly described hereinafter may be dependably and reliably achieved.

Underneath the conveyor belt 17 and preferably though not necessarily underneath the return portion thereof, is positioned what I shall term a condenser plate 50 (see Figures 1 and 2), this plate being made of a suitable metal, conveniently a sheet metal of suitable thickness and having a dimension crosswise of the belt (see Figure 2) preferably somewhat in excess of the width of the belt itself or the width of the plate 20 while its length (see Figure 1) is somewhat in excess of the over-all dimension of the electrode structures 27 and 28 in the direction of the length of the machine.

The plane of the condenser plate 50 is parallel to the plane of the tip ends z of the electrode members of the structures 27 and 28 and plate 50 is mounted in any suitable manner so that it may be moved in a vertical direction but maintained parallel to the tips. An illustrative form of mounting is shown in Figure 1 and will be seen to include screws 51 and 52 that extend vertically and that are threaded into suitable brackets 50$^a$ and 50$^b$ at the ends of the plate 50. Screws 51—52 are supported in suitable bearings so that they may be rotated about their vertical axes while held against longitudinal movement; conveniently, these bearings may be supported by or formed in suitable brackets 53 and 54 secured to the frame 10 or to the standards 11—12, respectively. The frame 10, and conveniently the standards 11—12, rotatably support a shaft 55 provided with a handwheel 56 so that shaft 55 may be manually rotated. Bevel gears 57 and 58 fixed on shaft 55 transmit the rotation of the latter to the elevating screws 51—52 by means of bevel gears 59 and 60, respectively, secured to the screws 51 and 52, respectively.

Thus, plate 50 may be raised or lowered at will independently of or in conjunction with the raising or lowering of the electrode structures 27 and 28.

Immediately underneath that portion of the plate 20 that is underneath the rotating electrode structure 27 (see Figure 1), I arrange, in substantially a circle, a suitable number of gaseous conduction devices 61 (Figures 3 and 4), devices 61 being preferably in the form of elongated glass tubes containing a suitable gas at a relatively low pressure such as, for example, neon at a pressure of about six millimeters of mercury. These gaseous conduction tubes 61 extend in a general vertical direction though they are preferably inclined downwardly and outwardly so that the assemblage thereof forms in effect a frustum of a cone, for reasons more clearly pointed out below.

Each device 61 has an electrode 62 at its lower end (see Figure 3) made of any suitable metal and leading from the electrode 62 and through the lower end wall of the glass tube 61 is a connecting wire or lead 63. These connecting wires 63 of the device 61 may be utilized to assist in holding the devices in position and they are connected to a screw 64 which passes through a small radially extending metal strap or connector 65 and thence through a solid dielectric plate-like support 66 carried by the depending flanges 21$^a$ and 22$^a$ and thence is threaded into a metallic sphere-like member 67. Preferably, and in order to achieve greater compactness of construction, the support 66 has depending therefrom and in electrical connection with the connecting strap 65 additional sphere-like members, and illustratively two such additional members 68 and 69 are shown in Figure 3. Thus, the electrode 62 at the bottom of each gaseous conduction device 61 is electrically connected to the connecting strap 65 and to three spherical members 67—68—69 depending from the solid dielectric support 66, and collectively frunction as a plate of an electrostatic condenser.

The upper ends of the glass tubes 61 are fitted into peripheral recesses in a ring-shaped solid dielectric member 70 (see Figures 3 and 4) which is so dimensioned that the upper rounded ends of the gaseous conduction devices 61 are held in a circle whose diameter is substantially the same as the diameter defined by the rotating electrode tips z above described. Moreover, these parts, namely, the upper ends of the tubes 61 and the rotating electrode structure 27 are so related that their axes are coincident. The periphery of the ring-shaped member 70 (Figures 3 and 4) is recessed to receive a cord or suitable string 71 which extends thereabout and engages the tubes 61, thus tying the latter to the member 70. The tubes 61 are preferably and conveniently made of suitable glass or other suitable dielectric material.

Resting upon the upper ends of the circularly arranged conduction devices 61 (see Figures 3 and 4) is a disk-like member 72 having a depending peripheral flange 72$^a$; member 72 is made of a material like Pyrex glass or fused quartz and its coaction with certain other parts of the apparatus will be fully described hereinafter.

Member 72 is preferably spaced downwardly from the under side of the plate 20, along which the belt 17 moves, and this spacing and certain electrical actions are achieved by means of a ring-shaped member 73 (Figure 3) of solid dielectric material such as quartz or Pyrex glass; it has a mean diameter substantially equivalent to the mean diameter defined by the upper ends of the tubes 61.

The members 67—68—69, there being three such members for each of the gaseous conduction tubes 61, will be seen to be radially distributed and arranged in a plane that is substantially parallel to the common condenser plate 50 above described, and are adapted to coact with the latter to form appropriate electrostatic capacities for achieving an action described more clearly hereinafter.

A substantially identical arrangement of gaseous conduction devices and related parts is interposed between another portion of the condenser plate and the electrode structure 28, and this arrangement may be repeated for as many additional electrode structures as it may be desired to employ aside from the illustrative structures 27 and 28 above described.

A suitable high potential is impressed across the electrode structures 27—28 and the plate 50 and the latter is preferably and conveniently grounded to the frame 10. As illustrative of a preferred form of source of high potential, I have shown in Figure 1 the high voltage winding 33 of a transformer, one terminal of which is connected as by conductor 34 to the frame 10 and hence to the condenser plate 50 while the other terminal is connected by conductor 35 to the electrode structures 27—28, the latter being thus maintained at high potential. The low voltage winding 36 of the transformer is energized by a suitable source of alternating current of preferably relatively high frequency and illustratively and preferably is connected, as by conductors 37 and 38, to an alternator 39 of a frequency on the order of 640 cycles per second. The ratio of transformation is such that the potential applied to the multiple electrodes 27—28 is on the order of 150,000 volts, that potential difference thus existing between the above described parts 27—50 and 28—50 which form in effect, in the illustrative embodiment, series-multiple capacities or condensers in the high voltage circuit.

In view of the various factors, some of which are pointed out below, I prefer to achieve a change in the potential applied to the apparatus and accordingly I have shown in Figure 1 an illustrative way in which the voltage applied may be changed at will; thus the alternator 39 has an exciting field 61 energized by a suitable exciter 62 and a variable resistance 63 is provided to change the excitation of the alternator 39 so as to change the voltage of its output and hence to change the voltage of the high voltage winding 33.

It is to be understood, however, that the specific frequency of 640 cycles above-mentioned is not to be treated by way of limitation and that the same is true with respect to the above-mentioned voltage, these factors, together with the speed of travel of the belt and the thickness and nature of the material to be treated being appropriately proportioned with respect to each other. The illustrative figures above set forth may, however, be considered as illustrative where the material to be treated is, for example, corn-meal that is packaged in packages having a vertical dimension as viewed in Figure 1 of about two inches, thus giving the material undergoing sterilization a thickness of about two inches. Under these illustrative conditions, the spacing of the horizontal plane of the tips $z$ of the electrode members from the upper surface of the corn-meal, shown in Figure 1 as contained in packages C, is about three-eighths of an inch while the spacing of this horizontal plane of the tips $z$ of the electrode members from the other condenser element 50 may be approximately thirty inches. If it is desired to use a frequency higher than the illustrative frequency above-mentioned, the speed of the belt may be substantially commensurately increased; likewise by increasing the number of electrodes, a greater speed of travel of the belt may be achieved.

Assuming no material, articles, or products, to be on the belt 17, there is, in the circuit of the high voltage transformer winding 33, a number of parallel capacities (each made up of series capacities) corresponding to the number of electrode structures employed; and it will suffice for present purposes to consider the action that takes place in the high voltage circuit embodying only one of the electrode structures since this action, excepting for certain features employed to cope with special peculiarities met with in practice, and as will be more clearly described hereinafter, is the same for all of the electrode structures employed; accordingly, the action occurring in the circuit of electrode structure 27 will be considered.

The high potential employed is, as above pointed out, applied across the electrode structure 27 and the common condenser plate 50, the latter being preferably grounded. Since the effective discharging portions of the electrode structure 27 approximate points (see the tips $z$ of Figure 6), the voltage gradient is high in the region underneath the electrode members $27^a$, $27^b$, etc., and a relatively large fraction of the voltage drop across the parts 27—50 takes place between the tips of the electrode members and the plate 20. As the articles or material to be treated, illustratively packaged material, such as that above-mentioned and indicated in Figure 1 at C, is carried in a direction toward the right, as viewed in Figure 1, by the belt 17, the articles are brought first into the region of high voltage gradient under the electrode structure 27 and subsequently in a similar region of high voltage gradient immediately underneath the electrode structure 28.

The material to be treated, illustratively corn-meal, as well as the pasteboard or paper package in which it is contained (where it happens to be packaged) has an average permittivity that is considerably higher than the air which theretofore constituted the dielectric in the space between the plate 20 and the electrode tips $z$. The introduction of the material into this region brings about certain changes in the high voltage circuit, depending upon the relation of certain parts and the electrical conditions that are made to exist before the material is introduced.

For example, with a given high voltage, I may so position the electrode structure 27 with respect to the material-carrying portion of the belt 17, as by manipulating the hand-wheel 49, and I may so position the condenser plate 50, as by the hand-wheel 56, that, referring now to Figures 1 and 3, I cause rupture of the air in the space intervening the electrode tips $z$ and localized portions of the plate 20 by a corona discharge of many fine streamers. This discharge emanates from the tips of the rotating electrode members $27^a$, $27^b$, etc., to the plate 20. Considering first briefly certain of the electrical actions that take place in the high voltage circuit of electrode structure 27, it should first be noted that the gaseous content of the tubes 61 is ionized, due to the dielectric stress to which the content is subjected, and that the upper end of the conductive gaseous column of each tube 61 forms a capacity with the lower end of the above-mentioned corona discharge which impinges upon or terminates on the upper face of the plate 20, the solid dielectric of this capacity being made up of the members 72, 73, 20 and the glass of the tube 61 (see Figure 3). These individual capacities are, with given dielectrics therein, fixed and are in multiple and, for convenience, will be hereinafter referred to as the fixed multiple capacity or capacities. It should also be noted that the members 67, 68, 69 associated with the electrode 62 at the lower end of any one tube 61 function as one plate of a condenser, the other plate of the condenser is the common condenser plate 50 and, because of the provision of individual condenser plates provided at the electrode ends of the respective tubes 61, there is thus provided a multiplicity of capacities which are also in multiple but which, due to the fact that the relative position of plate 50 may be changed, are variable in electrical capacity. These latter multiple capacities will be for convenience referred to hereinafter as the variable capacity or capacities.

These fixed and variable capacities are so proportioned that they limit the current flow to a safe value and are of sufficient dielectric strength to withstand the total transformer voltage. For example, though the average voltage gradient in the region extending from the electrode tips $z$ to the plate 20 is so high that the intervening air space ruptures locally with consequent corona discharge, the fixed and variable capacities do not break down. These fixed and variable capacities are connected in series by the relatively low resistance electronic conduction paths of the tubes 61.

The various devices and the arrangement thereof, as described in the foregoing, effect a non-uniform dielectric field with consequent localized corona discharges in the treatment zone. These corona discharges occur between each of the electrode tips $z$ and localized areas immediately thereunder and upon the plate 20. Each of these discharges is substantially conoidal in configuration with its apex at an electrode tip $z$ and with its base localized on the plate 20 over upper end or ends of the gaseous conduction tube or tubes 61 nearest or equally near thereto.

The gaseous conduction tubes 61 are ionizable at a lower voltage gradient than the ambient air and provide current paths, by disruptive conduction, of relatively low impedance. In consequence, the dielectric field which exists laterally of these tubes prior to their ionization is caused to collapse by the ionization of these tubes, which then, in effect, short-circuit that dielectric field during the period of their ionization and cause a concentration of dielectric flux in the vicinity of their upper, or electrode-less ends.

This flux concentration with consequent localized corona discharges in the treatment zone results in a sterilizing treatment which is practically homogeneous in current density; that is, the current density in that portion of the product under treatment that is nearest an electrode tip $z$ is but slightly greater than it is in that part of the product nearest the belt 17, as the configuration of that part of the corona discharge which is within the product is substantially that of a frustum of a conoid. Yet the concentration is not of such density as results in spark-discharges.

As the electrode structure 27 rotates, the conoidally shaped discharges emanating from the tips $z$ thereof form a ring-like or annular region of discharge which to the eye seems to be of continuous or steady duration.

Into the above-mentioned treatment zone, the articles or materials to be treated are conveyed by the continuously moving belt 17. The material, having a higher average permittivity than the air intervening the particles of the material and of the air which it displaces in the treatment zone, causes a redistribution of voltages in the high voltage circuit. As a result corona discharge occurs at a lower point on the voltage wave with a consequent increase in its duration. Corona takes place within and throughout the material and because the contaminating insect life has a substantially infinite permittivity and is in effect electrically conducting, this insect life is sought out by the corona streamers which pass therethrough and thus bring about its destruction.

The uniform current density, toward the achievement of which the electronic conduction devices 61 contribute, aids materially in achieving effective and uniform destruction of insect life.

If the material is packaged as, for example, in pasteboard cartons or packages, the above-described actions likewise take place but are accompanied by a further action which prevents puncturing of the material of the carton. The pasteboard or paper or like material of the package has an average permittivity that is considerably higher than the air which, prior to the entry of the package into the treatment zone, constituted the dielectric between the electrode 27 and the plate 20 (see Figure 3), and the fixed and variable capacities above-mentioned which are brought into coaction with the carton material. More particularly, the walls of the carton or package act as condenser dielectrics which become serially related with the dielectrics of the fixed and variable capacities. The resultant redistribution of voltages throughout the thus newly and serially related condenser dielectrics is such that the voltage gradient across the material of the carton is below the puncturing gradient and hence puncturing of the material of the carton is positively precluded.

The solid dielectrics (members 72, 73 and 20) of the above-mentioned fixed capacities also function to protect the electronic conduction tubes 61 against puncture of the glass envelopes thereof and I am thus enabled to avoid the disadvantages that might accompany the use of electronic conduction devices of adequately thick walls. In the absence of such protective means, the walls of the tubes 61 would have to be made relatively very thick with the result that it would be difficult if not impossible to achieve a sufficient homogeneity of current density at the bottom of a product under treatment because in turn the gas columns could not be sufficiently closely spaced.

Purely by way of illustration, I may note that, of the total voltage, illustratively above set forth as 150,000 volts, about one-half or approximately 75,000 volts, is dissipated as a voltage drop in the treatment zone and the remainder is distributed approximately equally between the fixed and variable capacities, each accounting for a voltage drop of around 37,000 volts. The voltage drop through the gaseous conduction devices 61 may be relatively small and may, for example, be on the order of 1,000 volts or less. These figures are to be understood to be purely illustrative and may be varied at will to suit the particular conditions to be met with in practice.

Certain other features of action of the apparatus are dealt with in detail hereinafter.

I may, however, so increase the spacing of the electrode tips $z$ above the belt 17, as by manipulating the handwheel 48, that, prior to the entry of the material into the treatment zone, local rupture therein does not take place. In such case, the air dielectric in the treatment zone is highly stressed and the dielectric flux emanating from the rotated electrode tips $z$ of the electrode structure 27 is, by the action of the electronic conduction devices 61, highly concentrated in an annulus like that above described in connection with the corona discharge or local rupture. The voltage gradient is high in this region and is effective throughout this annulus in a downward direction, as viewed in Figure 3; the ring-shaped member 73, being of higher permittivity than the air in the treatment zone, forms a path of higher permittance for this flux and aids to concentrate it toward the circularly arranged upper ends of the devices 61. The latter are conductive, being ionized by the dielectric field, and prevent the substantial straying of this flux laterally of the tubes 61, while the voltage gradient between the members 67, 68, 69, etc., and the grounded condenser plate 50 is very low and the air dielectric therebetween and also the dielectrics between the gas columns in tubes 61 and the plate 20 of sufficient dimension to withstand the total applied voltage without rupture.

As the materials or articles to be treated are moved into the region under the rotating electrode structure 27, they are brought into this highly concentrated dielectric flux which, due to the circular arrangement of the electrodes and their rotation, is in the form of the annulus above-described and which extends through the air dielectric which has a permittivity of unity. But as above pointed out, the material, as well as the pasteboard, or paper, or like material, in which it is packaged, has an average permittivity that is considerably higher than the air which theretofore constituted the dielectric between the electrode 27 and the plate 20 (see Figure 3) and because of its higher permittivity, it brings about, when brought underneath the electrode tips $z$, such a redistribution of the voltages across the various elements (including also the fixed and variable capacities) between the electrode tips $z$ and the condenser plate 50, that the air in the treatment zone in series with the material is overstressed with the result that a corona discharge takes place from the tip ends $z$ of the electrode members $27^a$, $27^b$, etc. and throughout the material and thence to plate 20.

The resultant action in concentration of the discharge, in effecting destruction of the insect life, and in preventing puncturing of the material of the carton where the product or material undergoing treatment is packaged will be clear in view of what has been already above set forth.

I prefer, however, to operate the apparatus as I first described above, namely, with the discharge taking place even before the package enters the treatment zone; this because I achieve better regulation of the voltage of the transformer in that the increase in energy, due to the entry of the package under these conditions, is insufficient materially to affect the voltage whereas the entry of the package into the treatment zone prior to the existence of the discharge therein causes a change in load character of the apparatus from substantially no load to substantially full load with resultant undesirable effect upon the voltage regulation. To counteract this latter effect, I find it desirable, however, where I wish so to operate the apparatus, to so set the condenser plate 50 that a lesser fraction of the total voltage is dissipated as a voltage drop through the treatment zone than would otherwise be the case. In any event, however, I am enabled to achieve very efficient and effective destruction of insect life.

I may also achieve a different kind of control of the discharge in the treatment zone by varying the variable capacity, as by manipulating the hand-wheel 56. For example, by raising the condenser plate 50, thus increasing the capacity of the variable capacity, I cause a greater energy to be expended in the treatment zone and I am enabled to make the individual corona streamers that emanate from the electrode members or tips more intense. This may be desirable under certain circumstances but I may note that the more intense that the streamers are made to be the less are they in number and that I prefer the arrangement above initially described as I thereby achieve the emanation of many fine corona streamers from the electrodes and thus achieve a more thorough permeation of the material undergoing treatment.

It will be understood, however, that I prefer that, in any event, the variable and fixed capacities above-mentioned are such that their respective dielectrics can safely withstand the potential of the system without rupture. Were such rupture to take place, substantially the entire transformer voltage would be impressed upon the material of which the carton is made, with resultant puncturing. Also, the variable capacity is of such magnitude that it prevents break-down of the solid dielectric (members 20, 73 and 72 of Figure 3) of the fixed capacity, and thus, in preventing break-down of that dielectric, protects the conduction devices 61 against the over-stressing and damage that would result to them were this dielectric to be ruptured. The variable air condenser also makes it possible to use a minimum of solid dielectric material in this fixed capacity which protects the conduction devices and thus, in avoiding the use of too much solid dielectric material, achieves a more effective and more efficient concentrating action by the conduction devices 61 than would be the case if an excessive amount of solid dielectric material had to be employed adjacent their upper ends.

It may at this point be noted that the packaged material, such as corn-meal, flour, or the like, and assumed to be contaminated with insect life, may be considered as a heterogeneous dielectric made up of various dielectrics in series multiple arrangement and containing isolated capacities, the latter being the contaminations represented by the various stages of insect life. If the material is packaged, the pastboard, paper, or the like, of the package itself, constitutes a dielectric of one permittivity, the individual particles of the meal, flour, or the like, constituting a dielectric of still another permittivity, and the air intervening these particles constitute still another dielectric but one of lowest permittivity of all, namely unity. When this heterogeneous dieleecric enters the treatment zone, the dielectrics of higher permittivity cause over-stressing of the air dielectric with resultant ionization and break-down thereof. The contaminating particles, such as insects, eggs, larvæ or pupæ thereof, are, however, of substantially infinite permittivity and are in effect conducting so that the corona streamers virtually seek out and pass through these contaminating particles and thus effectively bringing about their destruction.

The member 72, particularly where it has the downwardly extending flange $72^a$ (see Figure 3), very materially increases the surface leakage path between, for example, the member 20 and the condenser electrodes 67, 68, 69, etc., and thus contributes materially toward preventing surface arc-over along the tubes 61. This feature also makes it possible to use shorter tubes 61 than might otherwise be necessary.

The above-described actions take place simultaneously between each individual electrode tip $z$ (illustratively four in number as above noted) and the condenser plate 50, and due to the relatively rapid rotation of the electrode structure 27 and the electrode members carried thereby, the substantially vertical axis from one electrode tip to the plate 50 is moved in a curved path (as viewed in a horizontal plane) crosswise of the package or of the mass of meal, flour, or the like, being transported by the belt and thus, as the articles or product continue to move toward the right, as viewed in Figure 1, all portions of the meal, flour, or the like, are subjected to the actions above-described. Preferably, the dimension of the mass of infested material in a direction crosswise of the belt is less than the diameter of the circle around which the electrode members $27^a$, $27^b$, etc. are spaced and the path of movement is preferably such that the middle point of this lateral dimension passes immediately underneath the axis of rotation of the electrode structure 27. As above pointed out, the direction of rotation is such that the portion $x$ of the electrode members (see Figure 6) is the leading portion while the tip $z$ is the trailing portion, and I have also pointed out the stream-line cross-section of the electrode members. The stream-line cross-section substantially prevents rarefication of air in the regions indicated generally at D in Figure 6 with consequent avoidance of a weakening of the dielectric strength of the air at those portions; thus, the corona discharge is made to emanate from the tip $z$ and not from portions higher up along the electrode members such as might be the case if the dielectric properties of the air were to be weakened as along the portions D. Thus, I am enabled with nicety and precision to control and maintain the actions described above.

It will be clear in view of what has above been said that all portions of the individual electrode members are, of course, maintained at the relatively high potential, but considering any portion of the material undergoing treatment underneath a point E, for example (Figure 6), of the curved portion $y$ to $z$, such point or portion has the effect of commencing the stressing of the air above the material to be treated and of the air intervening the particles of the material to be treated and as the electrode member continues its movement, in its arc of travel, over the particular part or portion of the material under consideration, this stressing or preliminary ionization of this air is increased by way of preparation for corona discharge from the tip portion $z$ which, being lowermost and hence nearest the material undergoing treatment, completes the stressing or ionization of this air to achieve the corona discharge above described.

The spacing between the rollers 15 and 16 that carry the belt 17 is made preferably relatively large so that substantial lengths of belt are interposed between the rollers and the portion of the belt overlying the upper ends of tubes 61 underneath the plate support 20 in order thus to minimize leakage or shunting to ground of current discharged from the electrode members through the material undergoing treatment. The belt 17, even though made of cotton, asbestos, canvas, or the like, is virtually a conductor of relatively high resistance and tends to form a shunt as above noted. Also, it is to be noted that the portion of the belt that is at any instant underneath the electrode structure 27 (or 28) does not coincide with an equipotential surface as it extends transversely of the general axis of the discharge from any electrode tip $z$. Accordingly, the portion of the belt under consideration is subjected to differences of potential acting in its plane and these differences of potential cause current flows in the belt. The spacing above-mentioned between the belt-supporting pulleys or rollers with the consequent extensions to the right and left of the belt from the active discharge regions minimizes loss of energy and cooperates to maintain the actions above described.

With respect to the electrode construction 28 and its individual electrode members $28^a$, $28^b$, etc., substantially similar actions as above described take place but the opposite directions of rotation of the electrode structures 27 and 28 come into important consideration where the material undergoing treatment is packaged or contained in cartons, such as pasteboard boxes and the like.

In Figure 8 I have indicated at F by a series of arrows, arranged in a circle, the path of movement of the electrode members of the part 27 of Figure 1 and have shown a package $C^1$ about to emerge from the treatment zone and a package $C^2$ having its leading ends already entered into the treatment zone. In Figure 9 I have indicated by the circle of arrows G the path and its direction of the electrode members of the part 28 of Figure 1 and have shown the package $C^1$ about to emerge from the treatment zone and the package $C^2$ with its forward end just entered into the treatment zone. In each instance diagrammatically portrayed in Figures 8 and 9 I have divided the treatment zone into two halves lying to either side of a vertical plane indicated by the line X—X in Figure 8 and line Y—Y in Figure 9.

The circles F and G of Figures 8 and 9 will now be seen, in view of what has been set forth above, to coincide also substantially with the circles represented by the upper ends of the electronic conduction tubes 61 that are underneath or in line with the respective electrode structures 27, 28, etc. that are employed. In fact, the circles F and G of Figures 8 and 9 may be considered to represent diagrammatically and in plan view the annuli of corona discharge above-described, these discharges, being made up of innumerable fine streamers, appearing to the eye as though they were substantially solid masses of somewhat luminous discharge; to this latter effect the rotation of the electrodes at relatively high speed contributes as do also the electronic conduction tubes 61 and coacting parts which act to control or concentrate the discharge as above described. Any one electrode tip, as it sweeps around in the course of its rotation, virtually sweeps successively over the upper ends of the devices 61 and the finely-streamered discharge emanating from the electrode tip is made successively to move from one neon tube 61 to the next, this action, duplicated by each of the remaining electrode tips, taking place with such great rapidity that the resultant annulus or annuli of corona discharge in the treatment zone appears as a steady and solid mass. These actions occur with such rapidity that the neon tubes appear, to the eye, to be steadily and continuously luminous.

The relatively high frequency of the high potential employed also contributes to the above-described actions and in this connection it might be noted that the half waves of this high frequency alternating potential which are principally effective, are those which cause positive corona streamers to emanate from the tips of the electrodes. The relatively high frequency also provides a potential and hence a resultant current flow that are of steep wave-front and this feature is also of material advantage.

Considering first Figure 8 and the package $C^2$, it will be noted that, due to the direction of rotation of the electrode structure 27, the electrode tips $z$ pass downwardly (as viewed in Figure 8 which is a plan view) and hence in a curved path across the package C² while the path of movement of the electrode tips and the above-described action thereof on the package C¹ (which has already traversed the path of movement of the package C²) is upwardly and hence crosswise of the package but in a direction reversed from that in which the action took place while the package C¹ was to the left of the plane X—X. These actions are repeated, as is diagrammatically indicated in Figure 9, when the package moves through the treatment zone underneath the rotating electrode 28. The resultant actions are important in that they insure treatment of the material contained in the packages adjacent both side walls $a$ and $b$ of the packages.

Due to certain possible electrical actions that might take place, caused mainly by the vertical walls of the container or package, there is a tendency, considering now the package C² in Figure 8, for the corona discharge to start through the package and hence through its contents only after the particular electrode tip has moved some distance downwardly, as viewed in Figure 8, from the side walls $a$, leaving the possibility that portions of the contents of the package immediately adjacent the side wall $a$ are untreated; this action has a tendency to take place due to such factors as flux refraction and the concentration of flux along the outer face of the wall $a$ with the tendency to cause the discharge to persist along that outer face from an electrode tip approaching the carton. Such persistence of the discharge over the outer surface persists until the electrode tip has moved over the carton and downwardly (as viewed in Figure 8) a slight distance from the wall $a$ whereupon that surface discharge ceases and the action above-described in detail is established and continues through the remainder of the contents up to the other side wall $b$. The product is therefore thoroughly treated excepting adjacent the wall $a$ which the electrodes approach as they rotate. But when the package comes into that portion of the treatment zone to the right of the plane X—X of Figure 8, these actions are reversed and whatever of the contents of the package adjacent the wall $a$ where the package occupied the position C² that remained insufficiently treated are now thoroughly treated as the package passes through the position C¹. These actions are repeated when the package passes through the treatment zone under the electrode structure 28.

However, the upper half portion of the leading end wall $c$ (as viewed in Figure 8) acts like the side wall $a$ above-described in connection with the package C² of Figure 8 so that no or an insufficient amount of sterilization of the contents immediately adjacent that half portion takes place while the lower half portion of the leading end wall $c$, like the side wall $b$ of the package C² of Figure 8, does not have this detrimental action or effect. Stated differently, where the movement of the electrode is in a direction to "wipe" the discharge onto the package, there is insufficient sterilization or failure of sterilization of the product immediately adjacent the side walls of the package while this detrimental action does not take place where the movement of the electrode with respect to the package is in a direction to "wipe" the discharge off of the package. At the rear end wall $d$ of the carton a similar action takes place excepting that there is failure or deficiency of sterilization of the product adjacent the lower half of the end wall $d$, as viewed in Figure 8, and complete sterilization of the product adjacent the upper half wall thereof.

However, as the carton C², referring now to Figure 9, becomes subject to the treatment zone under the oppositely rotating electrode structure 28, these actions are reversed and any possible absence or deficiency of sterilization of the material adjacent the respective half portions of the end walls is remedied and cured.

Where the material undergoing treatment is packaged, the oppositely rotating electrodes and hence the opposite directions of movement of the corona streamers or discharge (see the circles F and G of Figures 8 and 9) thus insure uniform and efficient treatment and dependable destruction of the insect life, preventing interference with the achievement of these results by the action electrically of the walls of the carton, package, or container. It is to be understood, however, that insofar as certain other features of my invention are concerned, the electrode structures need not rotate in opposite directions and also that, insofar as certain other features of my invention are concerned, the electrode structures, if provided with an adequate number of discharge tips, need not rotate at all. However, I achieve many important practical advantages with the rotating electrode construction described above.

The vertical adjustment of the electrode structures 27 and 28 by means of the hand-wheel 49 and the vertical adjustment of the coacting condenser plate 50 by means of the hand-wheel 56 have been above described, it being understood that any suitable means (not shown) may be utilized for insuring proper guiding of these movable parts and for insuring maintenance of parallelism of their respective planes as their respective positions are changed to meet various conditions. Products of different characteristics require different voltages for carrying out the actions above described but by means of the hand-wheels 49 and 56 I am enabled, with a given voltage at the high voltage winding 33 of the transformer to meet these varying requirements.

For example, let it be assumed that flour is to be sterilized instead of the above illustratively described corn-meal. Flour requires a higher voltage than does corn-meal and by raising the condenser plate 50 appropriately I am enabled to make effective upon the flour a suitable potential. Raising the condenser plate 50 increases the electrical capacity of the variable capacity and hence of the system, and more particularly effects such a re-distribution of the voltage drops into which the applied or available voltage is subdivided that a greater voltage drop is made available and effective in the treatment zone to suit the requirements of the flour.

Thus, I am enabled to meet a wide variety of conditions or requirements met with in practice, also, the arrangement above described, makes for a wide flexibility and adaptability. For example, the thickness of the material or layer of material undergoing treatment may vary as, for example, when packaged goods of a different size of package have to be treated. In such case I am enabled quickly, by manipulating hand-wheel 49, to give the electrode structure or structures the requisite or desired height above the material-carrying portion of the belt 17 and at once to compensate for such a change in the position of the active electrode member or members by re-setting condenser plate 50 by way of hand-wheel 56. Also, a change in size of package, for example, might be accompanied by a change in the character of product contained therein. For example, cornmeal might be packaged in one size of package the flour might be packaged in a different size. Thus, new conditions, dictated not only by the size of the package but also by the electrical requirements of the change in characteristic of the product, have to be arrived at, but it will now be seen that such conditions can be quickly and readily effected.

In conjunction with the re-setting of the electrical parts of the apparatus to meet such requirements as have been illustratively above described, I may also change the voltage applied to the apparatus by suitably adjusting the variable resistance 63 to change the voltage of the alternator 39 and thus I am enabled to meet the many varying conditions met with in practice.

With the electronic conduction devices 61 (see Figure 3) above-described, I am also enabled to achieve the highly efficient sterilizing action or actions above-described at a materially lesser applied voltage and thus I am enabled to decrease insulation difficulties and also to achieve operation with a less expenditure of electrical energy. In any case, also, I am enabled to achieve adequate and proper protection of the material undergoing treatment, whether it is packaged or not, due particularly to the effective control of the character of the discharge that I am enabled to achieve by means of the character and action of the condenser formed between the members 67, 68, 69, etc. and the plate 50. This air condenser insures the reliable maintenance of the fine streamer discharge or corona in the treatment zone and effectively prevents, where this preventive action is desired, a discharge in the treatment zone that has the characteristic of complete rupture or so-called spark-over or arc-over.

In connection with the form of the apparatus described in connection with Figure 3, it is to be pointed out that the use of three members 67, 68 and 69 electrically connected to the lower end of each conduction device 61 is purely illustrative inasmuch as the number of these members connected to individual devices 61 may be varied depending upon various factors such as the shape of the members employed, their size, conditions of voltage employed, characteristics of the material undergoing treatment, and like factors. For example, I might find that under certain conditions a single spherical member instead of the three will suffice for each individual tube 61 so long as the capacity formed therebetween and the condenser plate 50 is adequate to function as described in detail above. In the specific illustrative embodiment above described, I have found it desirable to employ three spherical members to give this particular capacity the desired characteristics under the illustrative conditions described above.

However, I may also connect all of the electrodes 62 in the lower ends of the conduction devices 61 to a common or single plate and in Figure 10 I have shown an apparatus, by way of a view substantially like that of Figure 1 in which the electrodes of the group of devices 61 underneath the electrode structure 27 are electrically connected to a single condenser plate 74, while a similar condenser plate 75 is electrically connected to the electrode 62 of the devices 61 that coact with the electrode structure 28. The condenser plates 74 and 75 may thus be physically substituted for the members 67, 68, 69, etc. of Figure 3 and conveniently they are supported in any suitable manner from the side members 21ᵃ and 22ᵃ (see Figure 3) of the belt-supporting structure. Condenser plates 74, 75, etc. may coact with a single condenser plate 50 like that of Figures 1 and 2 and the hand-wheel 56 may be utilized to change the capacity between any one plate, such as plate 74 and the plate 50, as may be desired and as will be clear in view of what has been set forth in detail hereinabove.

Preferably, however, I provide, instead of a common condenser plate 50, separate condenser plates 50ᶜ, 50ᵈ, etc., one for each condenser plate 74, 75, etc., respectively. Condenser plates 50ᶜ and 50ᵈ, like condenser plates 74 and 75, are conveniently substantially square (see Figure 11) and plates 50ᶜ and 50ᵈ are supported by a cross-beam 76 (Figure 10) preferably metallic, and the latter is in turn suitably related to the elevating screws 51 and 52 so that the hand-wheel 56 may be utilized to set the lower and grounded condenser plates.

With this arrangement I achieve certain important advantages, among which may be noted that the individual plates 50ᶜ, 50ᵈ, etc. counteract the tendency of flux from spreading or straying in a direction lengthwise of the belt, as might be the case if I employ a single lengthwise extending condenser plate (like the plate 50 of Figures 1 and 2) and thus I achieve a better action of the electronic devices 61 in that the latter are thus made to cope with less, if any, stray or leakage flux.

Also, the use of individual condenser plates for each electrode structure better segregates the otherwise parallel circuits and makes for better safety of operation. For example, should a batch or package of material that, for any reason, might be in such condition, for example, wet, as to give the package or material an unusual or unexpectedly high permittivity, it, as it enters into operative relation to the first of a series of electrode structures, would act substantially like a short-circuit or very low resistance conductor of so much of the discharge path as is represented by the thickness of the package or material; the resultant increased current flow, however, is limited to a safe value by the size and position of the condenser plate 50ᶜ underneath the first electrode structure and would not be unduly or perhaps undesirably increased, as might be the case if the electrode structure under which the package or batch of material happens to be could directly coact with a large condenser plate extending throughout the length of the apparatus. Under certain conditions of practical use, this feature of the arrangement of Figures 10 and 11 is highly advantageous though, as has already been made clear, excellent results are achieved by the arrangement of Figures 1 and 2.

The electrode structures 27 and 28 of Figure 10 are, of course, adjustable as was described in connection with Figure 1 and in conjunction with the setting of condenser plates 50ᶜ and 50ᵈ, etc., a wide variety of practical conditions can be effectively coped with.

Turning now to Figure 12, I have there shown an apparatus, certain parts being diagrammatically indicated, in which I am enabled to achieve still further advantages. I have again shown two oppositely rotating electrode structures 27 and 28 similar in so far as their details of construction are concerned to those above described in connection with Figures 1-9 and 10 and 11; they coact with electronic conduction devices 61 and related parts, just as was above described and any of the air condenser arrangements above-described may be utilized in coaction therewith. By way of example, I have shown in Figure 12 the air condenser arrangement above described in detail in connection with Figures 10 and 11.

The disk members 27 and 28, carrying electrode members 27ª, 27ᵇ, etc., and 28ª, 28ᵇ, etc., respectively, are, however, secured directly to the lower ends of the shafts 78 and 79 of electric motors 80 and 81, respectively, the latter being supported on a metal cross-beam 82 which may conveniently be of channel iron (see Figure 13), or it may be of any other suitable construction, such as of built-up steel sections.

Motors 80 and 81 are of any suitable construction and preferably are alternating current motors; they may, for example, be of the single phase induction type with any suitable or appropriate arrangement such as a split phase winding and a control therefor to facilitate starting, and they are secured to the member 82 in any suitable manner, the motor shafts 78—79 passing through the member 82 so that the electrode structures 27—28 may be supported in depending relation from the beam 82.

One terminal of the winding of each motor is grounded to the motor frame and hence is also grounded to the beam 82. This grounding may be achieved in any suitable manner and I have diagrammatically indicated one terminal of the motor 80 as being grounded to the motor frame by conductor 83 and one terminal of motor 81 grounded by conductor 84 to the frame of that motor. The other terminal of motor 80 is connected by conductor 86 to one terminal of the winding 85 of an insulation transformer while the remaining terminal of motor 81 is similarly connected by conductor 86 to the same terminal of the winding 85 of the insulation transformer. The remaining winding 87 of the insulation transformer is connected by conductors 88—89 to any suitable source 90 of alternating current and the latter may be of commercial frequency. The remaining terminal of winding 85 of the insulation transformer is connected by conductor 91 to the motor supporting beam 82. Thus, motors 80—81 are supplied with energy and the speed of rotation of the electrode structure rotated thereby may be, as above noted, on the order of 1800 R. P. M.

The high potential winding 33 of the high frequency transformer 33—36 has its one terminal connected by conductor 34 to the grounded condenser plates 50ᶜ—50ᵈ while its other terminal is connected by conductor 92 to the motor supporting structure 82, the latter being thus maintained at high potential as are also the frames of the motors 80—81 and hence also the electrode structures 27 and 28.

Elevating screws 40 and 41 mounted, arranged, and operated as was described above in detail in connection with Figure 1 are in threaded engagement with threaded sleeves or nuts 93, 94, respectively (Figure 12) and preferably formed integrally with the latter are members 95 and 96 slotted as at 95ª and 95ᵇ and 96ª and 96ᵇ, respectively; into these slots are received elliptical members 97, 98, 99 and 100, respectively, the latter being formed of any suitable dielectric material, such as molded bakelite, laminated bakelite, dilecto, or the like, the parts being so shaped that these insulating members fit snugly within their respective slots. Plates 95ᶜ and 96ᶜ, secured to the members 95 and 96 by screws 95ᵈ and 96ᵈ, respectively, securely lock and clamp the insulating members in place.

At the ends of the electrode supporting member 82 (see Figure 12) are secured members 101 and 102 shaped substantially the same as are the members 95 and 96 above-mentioned and into the slots of the former are received the lower parts of the insulating members 97, 98, 99 and 100, clamping and locking plates 101ª and 102ª rigidly securing these parts together.

Certain of the structural relations of these parts are better shown in Figure 13 in which the insulating support 98 appears in side elevation and from which its substantially elliptical shape is better seen. Extending across and along the major axis of member 98 and integrally formed with the latter is a part 98ª. Similarly, the remaining supporting insulating members 97, 99 and 100 are also provided with cross-members 97ª, 99ª and 100ª, respectively.

Mechanically these insulating suspending members 97, 98, 99 and 100 support the electrode structures and the motors driving the latter, the load of these parts and of the metallic support 82 being transmitted by these insulating members to the threaded sleeves or nuts 93 and 94, rotation of the screws 40 and 41 in one direction or the other in response to actuation of the hand-wheel 49 raising or lowering the electrode structures for purposes and for the achievement of actions, all of which will be clear in view of what has been set forth above in connection with Figure 1, for example. The cross-members 97ª, 98ª, etc. function as compression members and resist distortion of the generally elliptically shaped insulating supports 97, 98, etc. due to the load they carry, and materially lessen any tendency to lengthen the minor axes of these members where they are made in elliptical shape.

Electrically, however, these insulating members achieve many important advantages. The electrode structures 27 and 28 and the motor support 82 are maintained at the high potential illustratively above set forth as being on the order of 150,000 volts and it is important effectively to insulate these parts from the remaining parts of the frame of the machine. These insulating members achieve such insulating action while at the same time, due to their configuration, a preferred embodiment of which is shown in Figure 13, such effective insulation is achieved without undue increase in the dimensions of the apparatus; in fact, I have been enabled to greatly diminish the over-all height of the apparatus, due to such features of construction as have just been noted.

In this latter connection, and referring particularly to Figure 13, it is to be noted that the vertical or straight-line distance from the part 101 to the part 95 (the former at the high potential and the latter at ground potential) is far shorter than the shortest surface leakage path available along the insulating support 98. Any surface leakage that might be induced or caused by the high potential part 101 would have to proceed along a path passing through such points as points o, p and q, indicated in Figure 13, and as long as that curved path is sufficiently long so that surface leakage cannot take place, the high potential parts are adequately insulated from the grounded frame of the apparatus. But it is to be noted that, because of the shaping of the insulating supports, I am enabled to diminish the over-all height of the apparatus by an amount substantially equivalent to the difference between the length of the path o—p—q— and the straight-line path o—q. These features are of manifold reaction upon such factors as compactness of construction of the entire apparatus, saving in materials cutting down expense of construction, and the like.

Referring now to Figure 12, it will be recalled that transformer 85—87 was above-described as an insulation transformer; it is constructed in any suitable manner safely to insulate the one winding from the other for the maximum voltage that is applied to the electrode structures and the details of the construction of this insulating transformer are, since they do not per se form part of the invention described herein, therefore not dealt with. It is to be noted, however, that the motors 80, 81, etc. may be 110-volt motors and operated, through the transformer 85—87, from any suitable source of commercial alternating current supply, such as a 110-volt supply; in that case the ratio of transformation of the transformer is unity but since winding 85, being connected to the high potential support 82, is thus maintained at the same high potential, illustratively 150,000 volts, is insulated or electrically isolated for this potential from the primary winding 87 which may thus be safely connected to any suitable source of commercial supply.

The action and operation of the rotating electrode structures of the form of my apparatus above described in connection with Figure 12 and their coaction with the electronic conduction devices and related parts, are substantially the same as was described above in detail in connection with Figures 1—11 and need not, therefore, be dealt with in detail again. It might, however, be pointed out that the same wide range of action and the same wide range of control of operation may be achieved as by suitably manipulating the hand-wheels 49 and 56 to achieve the desired character of action.

It is to be understood that the advantages, actions, and constructions of the rotating electrodes above described are important in meeting certain peculiar difficulties met with in practice, particularly where the material to be treated is packaged but that insofar as certain other features of my invention are concerned, the advantages and unique results of these features may be dependably realized in practice to meet other conditions of practical use whether or not the electrodes are of a rotating character and I therefore do not wish to be limited, unless specifically otherwise stated, to the rotation and immediately related features of the electrodes.

It will thus be seen that there has been provided in this invention an art and apparatus in which the various objects hereinbefore set forth, together with many thoroughly practical advantages, are successfully achieved.

Having claimed in my co-pending application Serial No. 566,261, filed October 1, 1931, the broad combination of elements whereby concentration or control of flux in the treatment zone is achieved, I make no claim herein broadly to that combination, though I do claim herein both broadly and specifically the combinations of elements including electronic conduction means for preventing straying or spreading of flux in the treatment zone.

As many possible embodiments may be made of the mechanical features of the above invention, and as the art herein described might be varied in various parts, all without departing from the scope of the invention, it is to be understood that all mattter hereinabove set forth or shown in the accompanying drawings, is to be interpreted as illustrative and not in a limiting sense.

I claim:

1. In electrical sterilizing apparatus in combination, an electric discharge circuit comprising a source of suitable potential, electrode means, means spaced from the latter for holding a product to be treated, electronic conduction means, and a condenser plate spaced from the latter, the spacing between said electronic conduction means and said condenser plate being sufficiently great to withstand break-down.

2. In electrical sterilizing apparatus, in combination, electrode means having electrode members spaced substantially about a circle, means for transporting a product to be sterilized into the region adjacent said electrode members, electronic conduction means effective in a circle whose diameter is commensurate with that of said first-mentioned circle, and means for impressing a suitable potential across the circuit including said electronic conduction means and the space between the latter and said electrode members.

3. In electrical sterilizing apparatus, in combination, a conveyor belt for transporting a product to be treated, electrode means spaced above said belt, electronic conduction means underneath said belt, a source of relatively high potential, and means for completing a circuit including said electrode means and said electronic conduction means and including means forming an electrical capacity.

4. In electrical sterilizing apparatus, in combination, a conveyor belt for transporting a product to be treated, electrode means spaced above said belt, electronic conduction means underneath said belt, a condenser plate spaced from said electronic conduction means, and a source of suitable potential connected across said electrode means and said condenser plate.

5. In electrical sterilizing apparatus, in combination, a conveyor belt for transporting a product to be treated, electrode means spaced above said belt, electronic conduction means underneath said belt, a condenser plate spaced from said electronic conduction means, a source of suitable potential connected across said electrode means and said condenser plate, and means of solid dielectric material interposed between said belt and said electronic conduction means.

6. In electrical sterilizing apparatus, in combination, a conveyor belt for transporting a product to be treated, electrode means spaced above said belt, electronic conduction means underneath said belt, a condenser plate spaced from said electronic conduction means, a source of suitable potential connected across said electrode means and said condenser plate, and means for causing the leakage path from a point in the plane of said belt to said electronic conduction means to be longer than the shortest distance therebetween.

7. In electrical sterilizing apparatus, in combination, a conveyor belt for transporting a product to be treated, electrode means spaced above said belt, electronic conduction means underneath said belt, a condenser plate spaced from said electronic conduction means, a source of suitable potential connected across said electrode means and said condenser plate, and solid dielectric means interposed between said belt and said electronic conduction means and including a member laterally overlapping said conduction means thereby to increase the leakage path thereto.

8. In electrical sterilizing apparatus, in combination, a conveyor belt for transporting a product to be treated, electrode means spaced above said belt, electronic conduction means underneath said belt, said electronic conduction means comprising a plurality of comparatively thin-walled tubes of glass or the like, a source of relatively high potential, means for including said electrode means and said electronic conduction means in the circuit of said source, and means for preventing the high potential of said source from rupturing said tubes.

9. In electrical sterilizing apparatus, in combination, a conveyor belt for transporting a product to be treated, electrode means spaced above said belt, electronic conduction means underneath said belt, said electronic conduction means comprising a plurality of comparatively thin-walled tubes of glass or the like, a source of relatively high potential, means for including said electrode means and said electronic conduction means in the circuit of said source, and means of solid dielectric material interposed between said tubes and said belt for preventing the high potential in said circuit from rupturing said tube.

10. In electrical sterilizing apparatus, in combination, a conveyor belt for transporting a product to be treated, electrode means spaced above said belt, electronic conduction means underneath said belt, said means including a plurality of gaseous conduction tubes each having an electrode in an end thereof, means connected to the electrodes of said tubes and forming a plate of a condenser, means spaced therefrom and forming another plate of said condenser, and a source of suitable potential connected to said electrode members and said last-mentioned plate-forming means.

11. In electrical sterilizing apparatus, in combination, a conveyor belt for transporting a product to be treated, electrode means spaced above said belt, electronic conduction means underneath said belt, said means including a plurality of gaseous conduction tubes each having an electrode in an end thereof, a conductive plate connected to the electrodes of said tubes, means forming a condenser with said plate, and a source of suitable potential connected to said electrode members and said last-mentioned means.

12. In electrical sterilizing apparatus, in combination, electrode means, electronic conduction means spaced therefrom, means for supporting a product to be treated in the space therebetween, a source of high potential having one terminal connected to said electrode means, means forming a capacity, said capacity-forming means being interposed between said electronic conduction means and the other terminal of said source.

13. In electrical sterilizing apparatus, in combination, a conveyor belt for transporting a product to be treated, electrode means spaced above said belt, electronic conduction means underneath said belt, said means including a plurality of gaseous conduction tubes each having an electrode in an end thereof, means comprising a plurality of conductive members, each connected to an electrode of said conduction means, conductive means spaced from said conductive members and adapted to form with the latter a capacity, and a source of suitable potential having one terminal connected to said last-mentioned means and the other connected to said electrode means.

14. In electrical sterilizing apparatus, in combination, a source of high potential; means forming an electric circuit therefor including electrode means, electronic conduction means spaced therefrom, and means forming a capacity; and means for passing a product to be sterilized through said space along a path sufficiently close to said electrode means to effect local rupture through the product, said capacity-forming means being sufficient to prevent complete break-down in said circuit.

15. In electrical sterilizing apparatus, in combination, a source of high potential; capacity-forming means connected thereto and including electrode means from which discharge can take place and means onto which said discharge impinges; a frame for supporting at least one of said means, and means for insulating said one of said means from said frame and including solid dielectric means shaped so that the shortest leakage path therealong is greater than the shortest straight-line distance between said frame and the means supported thereby.

16. In electrical sterilizing apparatus, in combination, a source of high potential capacity-forming means connected thereto and including electrode means from which discharge can take place and means onto which said discharge impinges; a frame for supporting at least one of said means, and arcuate means of solid dielectric material mechanically connecting said frame and said one of said means and engaging them at points such that the shortest leakage path therealong is longer than the shortest straight-line distance therebetween.

17. In electrical sterilizing apparatus, in combination, a source of high potential capacity-forming means connected thereto and including electrode means from which discharge can take place and means onto which said discharge impinges; a frame for supporting at least one of said means, and an elliptical member of solid dielectric material mechanically connecting said frame and one of said means.

18. In electrical sterilizing apparatus, in combination, rotary electrode means, a motor for driving said means, means for supporting a material to be sterilized in proximity to said rotary electrode means, means for stressing the space adjacent said electrode means and in which said product is supported and including a source of high potential connected to said electrode means, a frame, and means for insulatingly supporting said motor from said frame and including solid dielectric material shaped so that the shortest leakage path therealong is longer than the shortest straight-line distance between said motor and said frame.

19. In electrical sterilizing apparatus, in combination, rotary electrode means, a motor for driving said means, means for supporting a material to be sterilized in proximity to said rotary electrode means, means for stressing the space adjacent said electrode means and in which said product is supported and including a source of high potential connected to said electrode means, a frame, and means for insulatingly supporting said motor from said frame and including a plurality of spaced solid dielectric members each shaped so that the shortest leakage path therealong is longer than the straight-line distance between the parts to be insulated.

20. In electrical sterilizing apparatus, in combination, a source of high potential; means forming a capacity load connected thereto and including eletrode means and conductive means spaced therefrom; means for supporting a product to be sterilized adjacent said electrode means; and electronic conduction means for concentrating the dielectric flux emanating from said electrode means.

21. In electrical sterilizing apparatus, in combination, a source of high potential; means forming a capacity load connected thereto and including electrode means and conductive means spaced therefrom; means for supporting a product to be sterilized adjacent said electrode means; and gaseous conduction means for concentrating the dielectric flux emanating from said electrode means.

22. In electrical sterilizing apparatus, in combination, a source of high potential; means forming a capacity load connected thereto and including electrode means and conductive means spaced therefrom; means for supporting a product to be sterilized adjacent said electrode means; and an electronic conduction tube in the path of flux emanating from said electrode means.

23. In electrical sterilizing apparatus, in combination, a source of high potential; means forming a capacity load connected thereto and including electrode means and conductive means spaced therefrom; means for supporting a product to be sterilized adjacent said electrode means; an electronc conduction tube in the path of flux emanating from said electrode means; and means for preventing the high potential in the circuit from rupturing said tube.

24. In electrical sterilizing apparatus, in combination, a source of high potential; means forming a load therefor and including a plurality of individual electrode tips; means for supporting a product to be sterilized adjacent said tips; and a plurality of electronic conduction tubes disposed geometrically substantially the same as are said tips for controlling the dielectric flux emanating from said tips.

25. In electrical sterilizing apparatus, in combination, a source of high potential; means forming a load therefor and including a plurality of individual electrode tips; means for supporting a product to be sterilized adjacent said tips; and electronic conduction means having an effective area commensurate with the effective area of action of said tips for controlling the dielectric flux emanating from the latter.

26. In electrical sterilizing apparatus, in combination, a source of high potential, capacity-forming means connected thereto and including a rotatable electrode structure having a plurality of electrode members, and means for subjecting a product to be treated to the discharge from said electrode members, said members being stream-lined in shape.

27. In electrical sterilizing apparatus, in combination, a source of high potential, capacity-forming means connected thereto and including a rotatable electrode structure having a plurality of electrode members, and means for subjecting a product to be treated to the discharge from said electrode members, said members being curved along the arc of the circle defined by them during their rotation.

28. In electrical sterilizing apparatus in combination, a source of high potential, capacity-forming means connected thereto and including a rotatable electrode structure having a plurality of electrode members, and means for subjecting a product to be treated to the discharge from said electrode members, said electrode members being of progressively diminishing cross-section and curved rearwardly with respect to their direction of movement when rotating.

29. In electrical sterilizing apparatus, in combination, a source of high potential, capacity-forming means connected thereto and including a rotatable electrode structure having a plurality of electrode members, and means for subjecting a product to be treated to the discharge from said electrode members, said members being of circular cross-section but inclined rearwardly with respect to their direction of movement when rotating.

30. In electrical sterilizing apparatus, in combination, a source of high potential, capacity-forming means connected thereto and including a rotatable electrode structure having a plurality of electrode members, and means for subjecting a product to be treated to the discharge from said electrode members, said members individually lying along an arc of the circle which they describe when rotating and being inclined rearwardly with respect to their rotation of movement when rotating.

31. In electrical sterilizing apparatus, in combination, a source of high potential, capacity-forming means connected thereto and including a moving electrode structure having a plurality of electrode members, and means for subjecting a product to be treated to the discharge from said moving electrode members, said electrode members having leading portions more distantly remote from the product to be treated than are the trailing portions, thereby progressively to stress the air in the space occupied by the product to be treated.

32. In electrical sterilizing apparatus, in combination, a source of high potential, means for moving a product to be treated along a certain path, a plurality of rotating electrode structures, each having a plurality of electrode members, spaced along the path of movement of the product, conductive means juxtaposed to said electrode means so that the product is passed therebetween, and means for rotating said electrode means in opposite directions.

33. In electrical sterilizing apparatus, in combination, a source of high potential, two capacity-forming means connected in parallel thereto and each comprising a rotatable electrode structure having a plurality of electrode members, means for passing packaged material into proximity first to one rotating electrode means and then to the other, and means for rotating said electrode means in opposite directions.

34. In electrical sterilizing apparatus, in combination, a source of high potential, two capacity-forming means connected in parallel thereto and each comprising a rotatable electrode structure having a plurality of electrode members, means for passing packaged material into proximity first to one rotating electrode means and then to the other, and means for rotating said electrode means in opposite directions, said electrode members being of stream-lined cross-section.

35. In electrical sterilizing appaartus, in combination, a source of high potential, two capacity-forming means connected in parallel thereto and each comprising a rotatable electrode structure having a plurality of electrode members, means for passing packaged material into proximity first to one rotating electrode means and then to the other, and means for rotating said electrode means in opposite directions, said electrode members being inclined away from their direction of movement as they rotate.

36. In electrical sterilizing apparatus, in combination, a source of high potential, capacity-forming means connected thereto and including a rotatable electrode structure having a plurality of discharge electrode members arranged in a circle and circular electronic conduction means spaced therefrom and having an effective diameter substantially equal to the diameter of the circle of said electrodes; and means for supporting a product to be treated in the space between said electrode means and said conduction means.

37. In electrical sterilizing apparatus, in combination, a source of relatively high potential, spaced electrode means across which said source is effective; and means for positioning a material to be treated in between said electrode means, one of said electrode means comprising a discharge electrode and means for rotating it, said electrode being shaped to prevent rarefaction of the air on its trailing side.

38. In electrical sterilizing apparatus, in combination, a source of relatively high potential, spaced electrode means across which said source is effective; and means for positioning a material to be treated in between said electrode means, one of said electrode means comprising a discharge electrode and means for rotating it, said electrode being curved to present leading portions more distant from the material to be treated than trailing portions thereof.

39. In electrical sterilizing apparatus, in combination, a source of relatively high potential, spaced electrode means across which said source is effective; and means for positioning a material to be treated in between said electrode means, one of said electrode means comprising a discharge electrode and means for rotating it, said electrode being of substantially circular cross-section but inclined with respect to a plane at right angles to the axis of rotation so that its effective cross-section with respect to its path of travel is substantially elliptical.

40. In electrical sterilizing apparatus, in combination, a source of high potential, spaced means connected to said source of high potential, one of said means including a moving electrode member, and means for interposing between said spaced means a product to be treated to the discharge between said spaced means, said electrode member being stream-lined in shape.

41. In electrical sterilizing apparatus, in combination, a source of high potential, spaced means included in the circuit of said source, and means for interposing a product to be treated to the discharge between said spaced means, one of said spaced means including an electrode member moving along a certain path and the other of said means including electronic conduction means juxtaposed to said electrode member but extending along at least a portion of the said path of said moving electrode member.

42. In electrical sterilizing apparatus, in combination, a source of high potential, spaced means included in the circuit of said source, and means for interposing a product to be treated to the discharge between said spaced means, one of said means including an electrode member moving along a certain path and the other of said means including a plurality of electronic conduction tubes positioned along but spaced from the said path of movement of said electrode member.

43. In electrical sterilizing apparatus, in combination, a source of high potential, spaced means included in the circuit of said source, and means for interposing a product to be treated to the discharge between said spaced means, one of said means including an electrode member moving along a certain path and the other of said means including a plurality of electronic conduction tubes arranged substantially side by side with their one ends spaced from but alined along the path of movement of said electrode member.

44. In electrical sterilizing apparatus, in combination, a source of high potential; capacity-forming means connected thereto and including rotatable electrode means having a plurality of electrode tips lying substantially in a single plane and conductive means spaced from said plane; means for rotating said electrode means; and means for passing a product to be sterilized through said space along a path sufficiently close to said electrode tips to effect local rupture through the product but sufficiently spaced from said conductive means to prevent complete break-down between the said tips and said conductive means.

45. In electrical sterilizing apparatus, in combination, a source of high potential; means forming a discharge path therefor and including a rotatable electrode tip and conductive means spaced therefrom; means for rotating said electrode tip at relatively high speed and to define a circle in its rotation; and means for passing a product to be sterilized through said space along a path sufficiently close to said rotating electrode tip to prevent local rupture through the product but sufficiently spaced from said conductive means to prevent complete break-down between said tip and the latter.

46. In electrical sterilizing apparatus, in combination, means supplying high potential, means for passing a package containing material to be sterilized along a certain path, means forming electrical capacities energized from said high potential means and spaced apart, said package-passing means giving the package of material a path through the dielectric field formed by said capacity-forming means, said capacity-forming means including a plurality of movable discharge electrodes spaced along the path of travel of the package of material whereby the paths of movement of said plurality of discharge electrodes are spaced along the path of travel of said package, and means effecting movement of said spaced discharge electrodes each in a closed path distinct and spaced from the closed path of any other of said electrodes and each path twice intersecting the path of movement of the package caused by said package-passing means, whereby the discharge from each discharge electrode is twice traversed across and through the package of material but each successive time in reversed direction, said movement-effecting means causing one of said discharge electrodes to traverse its closed path in a direction opposite from the direction in which said movement-effecting means causes another discharge electrode to traverse its path.

47. In electrical sterilizing apparatus, in combination, means supplying high potential, means for passing a package containing material to be sterilized along a certain path, means forming electrical capacities energized from said high potential means and spaced apart, said package-passing means giving the package of material a path through the dielectric field formed by said capacity-forming means, said capacity-forming means including a plurality of movable discharge electrodes spaced along the path of travel of the package of material whereby the paths of movement of said plurality of discharge electrodes are spaced along the path of travel of said package, and means effecting movement of said spaced discharge electrodes each in a closed path distinct and spaced from the closed path of any other of said electrodes and each path twice intersecting the path of movement of the package caused by said package-passing means, whereby the discharge from each discharge electrode is twice traversed across and through the package of material but each successive time in reversed direction, said movement-effecting means causing one of said discharge electrodes to traverse its closed path in a direction opposite from the direction in which said movement-effecting means causes another discharge electrode to traverse its path, the respective closed paths of movement of said discharge electrodes intersecting at an angle the end and side walls of the package moving along the path provided by said package-passing means, whereby material adjacent said walls of the package is affected by discharge moving in a direction toward the wall to which the material is adjacent.

48. In electrical sterilizing apparatus, in combination, means supplying high potential, means for passing a package containing material to be sterilized along a certain path, means forming electrical capacities energized from said high potential means and spaced apart, said package-passing means giving the package of material a path through the dielectric field formed by said capacity-forming means, said capacity-forming means including a plurality of discharge electrodes spaced along the path of travel of the package of material, and means effecting movement of said spaced discharge electrodes each in a closed path and each path twice intersecting the path of movement of the package caused by said package-passing means, whereby the discharge from each discharge electrode is twice traversed across and through the package of material but each successive time in reversed direction, said movement-effecting means causing one of said discharge electrodes to traverse its closed path in a direction opposite from the direction in which said movement-effecting means causes the other discharge electrode to traverse its path, the respective closed paths of movement of said discharge electrodes intersecting at an angle the end and side walls of the package moving along the path provided by said package-passing means, whereby material adjacent said walls of the package is affected by discharge moving in a direction toward the wall to which the material is adjacent, the dielectric between said capacity-forming means being air and the path along which said package-passing means passes a package being so positioned that local break-down occurs from said discharge electrodes through the material in the package while the remaining air space is sufficiently great to prevent rupture thereof.

FRANKLIN S. SMITH.